(12) United States Patent
Monzen et al.

(10) Patent No.: US 9,154,358 B2
(45) Date of Patent: Oct. 6, 2015

(54) WIRELESS COMMUNICATION DEVICE AND METHOD OF DETERMINING REFERENCE SIGNAL

(75) Inventors: Maimi Monzen, Yokohama (JP); Sakiko Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/118,145

(22) PCT Filed: May 24, 2012

(86) PCT No.: PCT/JP2012/063317
§ 371 (c)(1),
(2), (4) Date: Nov. 15, 2013

(87) PCT Pub. No.: WO2012/165292
PCT Pub. Date: Dec. 6, 2012

(65) Prior Publication Data
US 2014/0093020 A1    Apr. 3, 2014

(30) Foreign Application Priority Data

May 27, 2011 (JP) ................................. 2011-119519

(51) Int. Cl.
*H03D 1/00* (2006.01)
*H04L 27/26* (2006.01)
*H04B 7/06* (2006.01)
*H04B 7/08* (2006.01)

(52) U.S. Cl.
CPC .......... *H04L 27/2663* (2013.01); *H04B 7/0617* (2013.01); *H04B 7/086* (2013.01); *H04L 27/2666* (2013.01); *H04L 27/2671* (2013.01); *H04L 27/2675* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| 6,154,487 A | 11/2000 | Murai et al. |
| 7,149,266 B1 * | 12/2006 | Imamura et al. ............... 375/355 |
| 2013/0336270 A1 * | 12/2013 | Nagata et al. ................. 370/329 |

FOREIGN PATENT DOCUMENTS

| JP | H11-41141 A | 2/1999 |
| JP | 2002-232386 A | 8/2002 |

(Continued)

OTHER PUBLICATIONS

International Search Report dated Jul. 24, 2012, issued for International Application No. PCT/JP2012/063317.

(Continued)

*Primary Examiner* — Adolf Dsouza
(74) *Attorney, Agent, or Firm* — Procopio, Cory, Hargreaves & Savitch LLP

(57) ABSTRACT

A wireless communication device according to the present invention includes a standard signal holding unit for holding standard signals, a correlation value calculation unit for performing a correlation operation between a received signal and the standard signals, and a reference signal selection unit for determining a reference signal from among the standard signals on the basis of a correlation operation result obtained by the correlation value calculation unit. When a correlation value peak which provides a maximum value is not detected among a correlation values obtained by the correlation operation between the received signal and the standard signals, the reference signal selection unit repeats a predetermined number of times, a process of performing a correlation operation between a new standard signal which is generated so that a head of a data part is located at some midpoint in a predetermined symbol interval and the received signal.

6 Claims, 10 Drawing Sheets

(56) References Cited

FOREIGN PATENT DOCUMENTS

| JP | 2003-110459 A | 4/2003 |
| JP | 2008-153927 A | 7/2008 |
| JP | 2010-278663 A | 12/2010 |

OTHER PUBLICATIONS

International Preliminary Report on Patentability dated Dec. 12, 2013, issued for International Application No. PCT/JP2012/063317.

* cited by examiner

F I G . 1
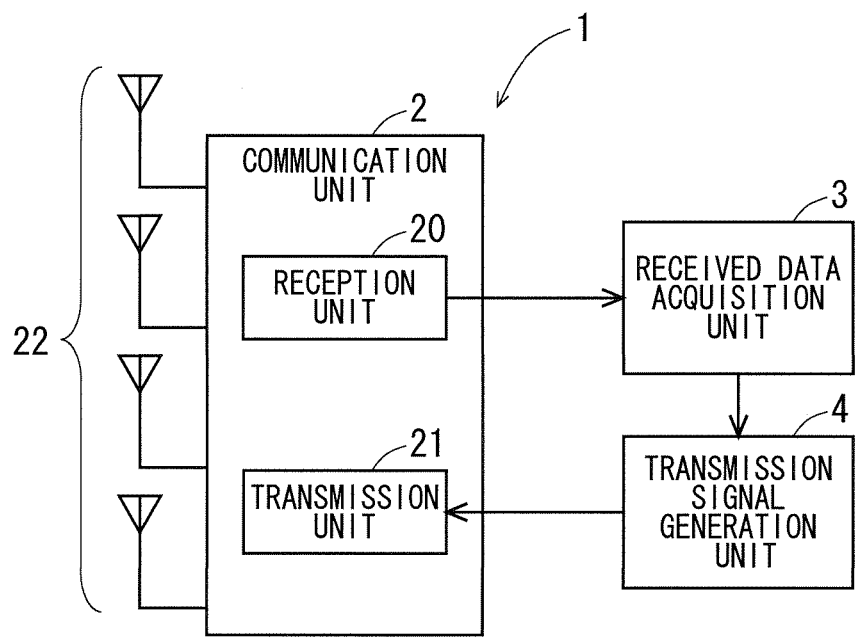

F I G . 5
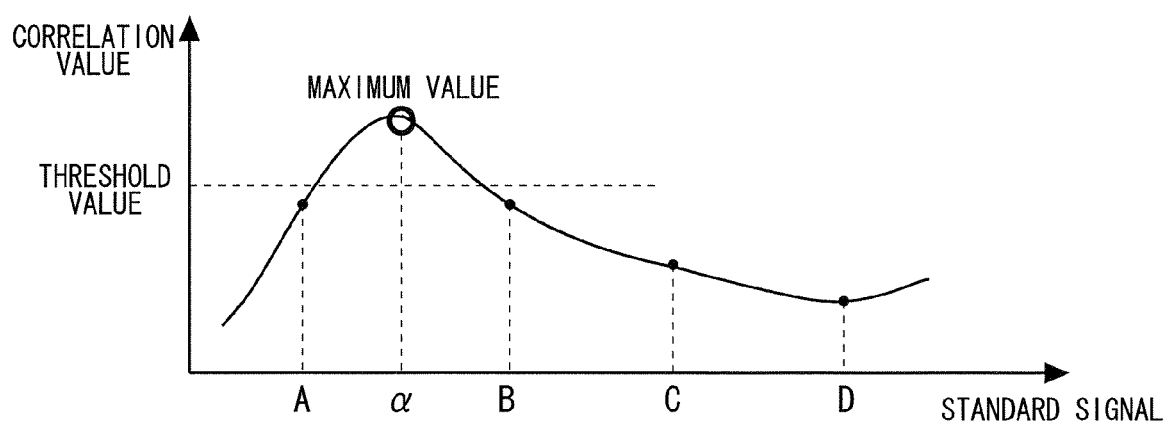

F I G . 1 0
(a)
−0.98079+0.19509i
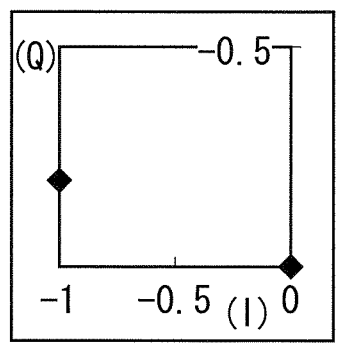
(b)
−1
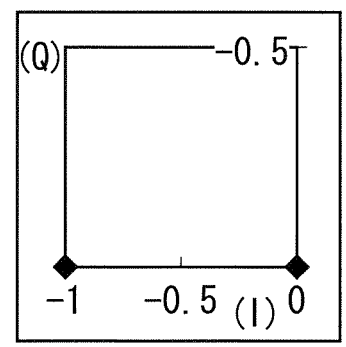

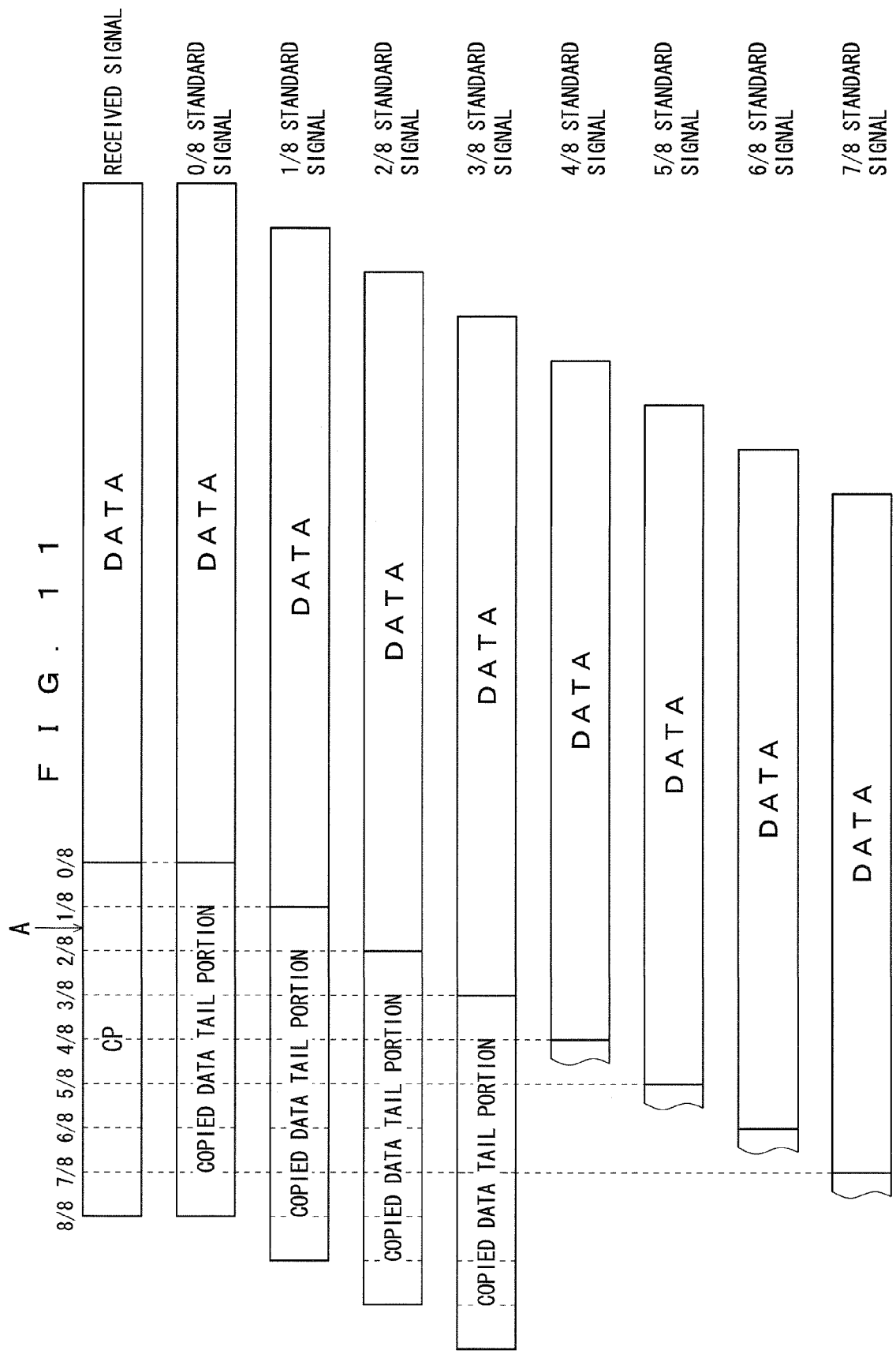

WIRELESS COMMUNICATION DEVICE AND METHOD OF DETERMINING REFERENCE SIGNAL

TECHNICAL FIELD

The present invention relates to a wireless communication device and a method of determining a reference signal, and more particularly to a wireless communication device and a reference signal determination method, which use adaptive array antennas.

BACKGROUND ART

Orthogonal frequency division multiplexing (OFDM) signals each have a guard interval (GI), which is a kind of cyclic prefixes (hereinafter, referred to simply as "CP"), at the head of each OFDM symbol.

The guard interval is a copy of a tail portion of an effective symbol and is provided to appropriately acquire data from a received OFDM symbol even if a receiving apparatus receives the OFDM symbol delayed from a proper timing due to transmission channel delay or even if a time waveform at a boundary between OFDM symbols is deformed due to multipath fading.

Conventionally, in order to extract frame timing and symbol timing of a received signal, used is a correlation operation to measure the degree of similarity between waveforms. In this case, the correlation operation between a received signal and patterns (standard signals) having excellent autocorrelation characteristics is performed so as to determine a position at which the square of the obtained correlation value is a maximum as the frame timing and acquire the symbol timing from the frame timing. Calculation of the frame timing using such a correlation method is disclosed in Japanese Patent Application Laid-Open Gazette No. 2008-153927.

Herein, the standard signals are signals generated by shifting a head position of a data part of a known signal at predetermined intervals (symbol intervals), and positions in the GI, which are obtained when the GI is equally divided by the predetermined interval, are referred to as cut positions. Since a standard signal that coincides with a cut position is determined as a reference signal, these positions are referred to as "cut positions".

The cut positions are set at intervals of, for example, eight symbols by equally dividing the GI consisting of 64 symbols by eight. FIG. 11 shows respective frames of standard signals that are thus set and a frame of a received signal having a GI that is equally divided into eight parts. The cut positions are labeled 8/8, 7/8, 6/8, 5/8, 4/8, 3/8, 2/8, 1/8, and 0/8, respectively, in order from the head of the GI provided at the head of the data part, and the head of the data part is 0/8.

Meanwhile, the standard signals are generated by shifting the position of the head of the data part at intervals of eight symbols. A 0/8 standard signal has the highest correlation with the received signal in a case where the received signal is not shifted.

As shown in FIG. 11, the standard signals are each generated by adding a copy of data of 64 symbols at a tail of the data part of the received signal, which is an original of the GI of the received signal, to the head of the data part as a copied data tail portion.

Further, a 1/8 standard signal has the highest correlation with the received signal in a case where the received signal is shifted by 8 symbols, and a 2/8 standard signal has the highest correlation with the received signal in a case where the received signal is shifted by 16 symbols. In this way, eight standard signals from 0/8 to 7/8 are prepared on the basis of the received signal and are stored in a form of a table in a memory or the like. Setting the number of standard signals to eight in this way is to limit the number of correlation operations to be performed. Therefore, the actual shift of the received signal does not always coincide with the prepared standard signal, and depending on the degree of shift of the received signal, there may be a case where no position at which the correlation value is maximum can be acquired.

For example, when the received signal is shifted so that the position indicated by the arrow A in FIG. 11 actually becomes the position where the correlation value is maximum, the actual cut position cannot be determined since no standard signal corresponding to that position is prepared. In this case, either the 1/8 position or the 2/8 position after or before the arrow A is determined as the cut position.

SUMMARY OF THE INVENTION

Problems to be Solved by the Invention

As discussed above, in an OFDM communication system, the frame timing is calculated by using the correlation characteristics of the GI of the received signal. Since the standard signals are set at intervals of eight symbols, however, the actual shift of the received signal does not always coincide with the prepared standard signal, and as a result, the accuracy of selection of the reference signal to be obtained becomes lower. Accordingly, the accuracy of calculation of a weight on the basis of the received signal and the reference signal, which is used for weighing of the received signal, becomes lower.

The present invention is intended to solve the above problem, and it is an object of the present invention to provide a wireless communication device and a reference signal determination method that improve the accuracy of selection of the reference signal.

Means for Solving the Problems

In order to solve the above problem, the present invention is intended for a wireless communication device for determining a reference signal on the basis of correlation values between a received signal and a plurality of standard signals and calculating an antenna weight by using the reference signal. A first aspect of the wireless communication device according to the present invention includes a standard signal holding unit for holding the plurality of standard signals, a correlation value calculation unit for performing a correlation operation between the received signal and the plurality of standard signals, and a reference signal selection unit for determining the reference signal from among the plurality of standard signals on the basis of a correlation operation result obtained by the correlation value calculation unit. In the wireless communication device of the present invention, the plurality of standard signals are generated by shifting a head position of a data part of a known signal at a predetermined symbol interval, and the reference signal selection unit repeats a predetermined number of times, a process of performing a correlation operation between a new standard signal which is generated so that a head of the data part is located at some midpoint in the predetermined symbol interval and the received signal when a correlation value peak which provides a maximum value is not detected among a plurality of correlation values obtained by the correlation operation between the received signal and the plurality of standard signals.

In a second aspect of the wireless communication device according to the present invention, the reference signal selection unit determines a standard signal that provides the correlation value peak as the reference signal when the correlation value peak is higher than a preset threshold value, and the reference signal selection unit repeats the process of performing a correlation operation between the new standard signal and the received signal the predetermined number of times when the correlation value peak is less than the preset threshold value.

In a third aspect of the wireless communication device according to the present invention, the reference signal selection unit determines a standard signal that provides the correlation value peak as a provisional reference signal and corrects the provisional reference signal by shifting the provisional reference signal by the amount of symbol shift calculated on the basis of the amount of phase rotation of the received signal, to thereby determine a reference signal obtained after correction as the reference signal when the correlation value peak is less than a preset threshold value.

In a fourth aspect of the wireless communication device according to the present invention, the reference signal selection unit generates the new standard signal so that the head of the data part is located at some midpoint in the predetermined symbol interval when standard signals which have correlation values indicating the highest value among the plurality of correlation values obtained by the correlation operation between the received signal and the plurality of standard signals are located adjacent to each other with the predetermined symbol interval.

In a fifth aspect of the wireless communication device according to the present invention, the plurality of standard signals each consists of a tail portion of the data part, which is an original of a guard interval of the received signal, and a copy of the data part.

The present invention is also intended for a reference signal determination method of determining a reference signal to be used for calculation of an antenna weight, on the basis of correlation values between a received signal and a plurality of standard signals. A first aspect of the reference signal determination method according to the present invention includes the steps of (a) performing a correlation operation between the received signal and the plurality of standard signals, and (b) determining the reference signal from among the plurality of standard signals on the basis of a correlation operation result obtained in the step (a). In the reference signal determination method of the present invention, the plurality of standard signals are generated by shifting a head position of a data part of a known signal at a predetermined symbol interval, and in the step (b), a process of performing a correlation operation between a new standard signal which is generated so that a head of the data part is located at some midpoint in the predetermined symbol interval and the received signal is repeated a predetermined number of times when a correlation value peak which provides a maximum value is not detected among a plurality of correlation values obtained by the correlation operation between the received signal and the plurality of standard signals.

In a second aspect of the reference signal determination method according to the present invention, in the step (b), when the correlation value peak is higher than a preset threshold value, a standard signal that provides the correlation value peak is determined as the reference signal, and when the correlation value peak is less than the preset threshold value, the process of performing a correlation operation between the new standard signal and the received signal is repeated the predetermined number of times.

In a third aspect of the reference signal determination method according to the present invention, in the step (b), when the correlation value peak is less than a preset threshold value, a standard signal that provides the correlation value peak is determined as a provisional reference signal, the provisional reference signal is corrected by shifting the provisional reference signal by the amount of symbol shift calculated on the basis of the amount of phase rotation of the received signal, and a reference signal obtained after correction is determined as the reference signal.

Effects of the Invention

According to the present invention, when the correlation value peak cannot be detected from the correlations between the received signal and the standard signals generated at predetermined symbol intervals, the correlation value peak is obtained by repeating the process of performing a correlation operation between a new standard signal which is generated so that the head of the data part is located at some midpoint in the predetermined symbol interval and the received signal. It is therefore possible to obtain a reference signal with high accuracy and increase the accuracy of an antenna weight calculated by using the reference signal.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram showing a constitution of a wireless communication device according to a preferred embodiment of the present invention.

FIG. 5 is a view showing correlation values with respect to the standard signals.

FIG. 10 is a view illustrating correction of the reference signal.

FIG. 11 is a view showing frames of the standard signals and a frame of a received signal having a GI that is equally divided into eight parts.

BEST MODE FOR CARRYING OUT THE INVENTION

The Preferred Embodiment

Figure 2:
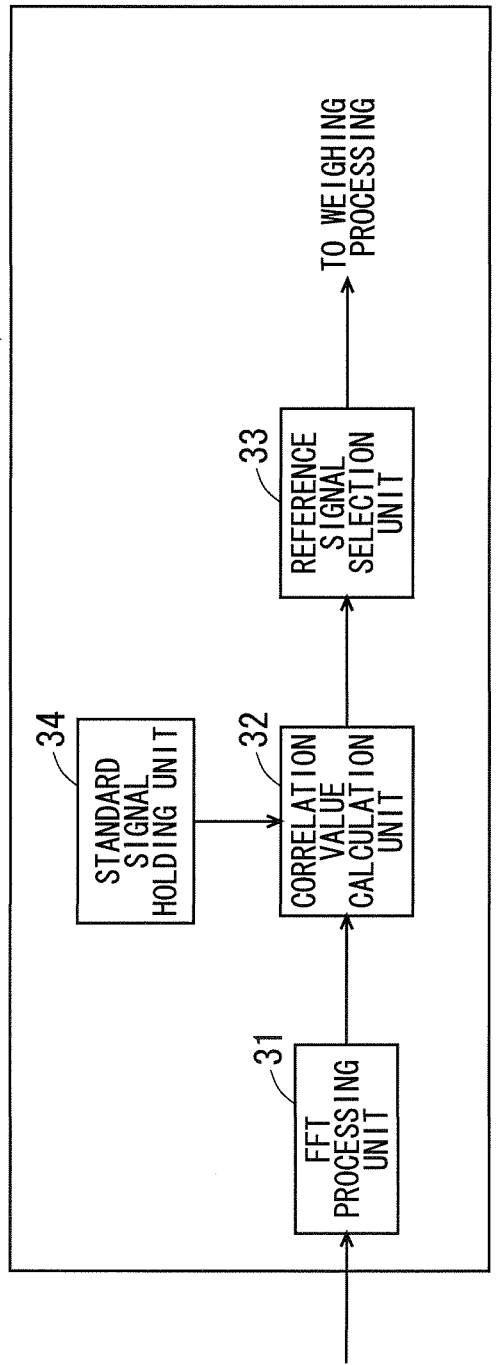
FIG. 2 is a block diagram showing a constitution of a received data acquisition unit of the wireless communication device according to the preferred embodiment of the present invention.

FIG. 1 is a block diagram showing a constitution of a wireless communication device 1 according to the preferred embodiment of the present invention. As shown in FIG. 1, the wireless communication device 1 includes a communication unit 2 which has a reception unit 20 and a transmission unit 21, a received data acquisition unit 3, and a transmission signal generation unit 4. The reception unit 20 and the transmission unit 21 share a transmission/reception antenna 22. The transmission/reception antenna 22 is an adaptive array antenna.

The reception unit 20 performs amplification and down-conversion on an OFDM signal of a carrier bandwidth received by the transmission/reception antenna 22, to thereby convert the OFDM signal into a baseband signal. Then, the reception unit 20 converts the baseband signal from analog to digital form and outputs the converted baseband signal.

The received data acquisition unit 3 performs FFT processing and the like on the baseband signal outputted from the reception unit 20, to thereby acquire data transmitted from a communication target from the baseband signal.

The transmission signal generation unit 4 generates data to be transmitted to the communication target and generates an OFDM signal of a baseband including that data.

The transmission unit 21 converts the OFDM signal outputted from the transmission signal generation unit 4 from digital to analog form. Then, the transmission unit 21 performs up-conversion and amplification on the analog OFDM signal and inputs the resultant OFDM signal to the transmission/reception antenna 22. The OFDM signal of the carrier bandwidth is thereby wirelessly transmitted.

FIG. 2 is a block diagram showing a constitution of the received data acquisition unit 3. As shown in FIG. 2, the received data acquisition unit 3 includes an FFT processing unit 31, a correlation value calculation unit 32, a reference signal selection unit 33, and a standard signal holding unit 34.

FIGS. 1 and 2 show only constituent elements that are highly relevant to the present invention and omit illustration of the other constituent elements.

The FFT processing unit 31 performs FFT processing on the baseband signal outputted from the reception unit 20, to thereby separate a plurality of subcarriers from the baseband signal, and outputs the subcarrier. For each of the subcarriers included in the baseband signal, the FFT processing unit 31 outputs a complex symbol to be used for modulation of the corresponding subcarrier.

The correlation value calculation unit 32 performs a correlation operation between the received signal after being subjected to the FFT processing and standard signals held in the standard signal holding unit 34, and outputs the result of the correlation operation to the reference signal selection unit 33.

The reference signal selection unit 33 detects respective cut positions corresponding to the standard signals and determines a reference signal on the basis of the correlation operation result obtained by the correlation value calculation unit 32. The reference signal determined by the reference signal selection unit 33 is to be used for calculation of an antenna weight to be used to control the directivity of the adaptive array antenna.

The present invention is characterized by the method of determining a reference signal, and details of the method will be described below.

Figure 3:
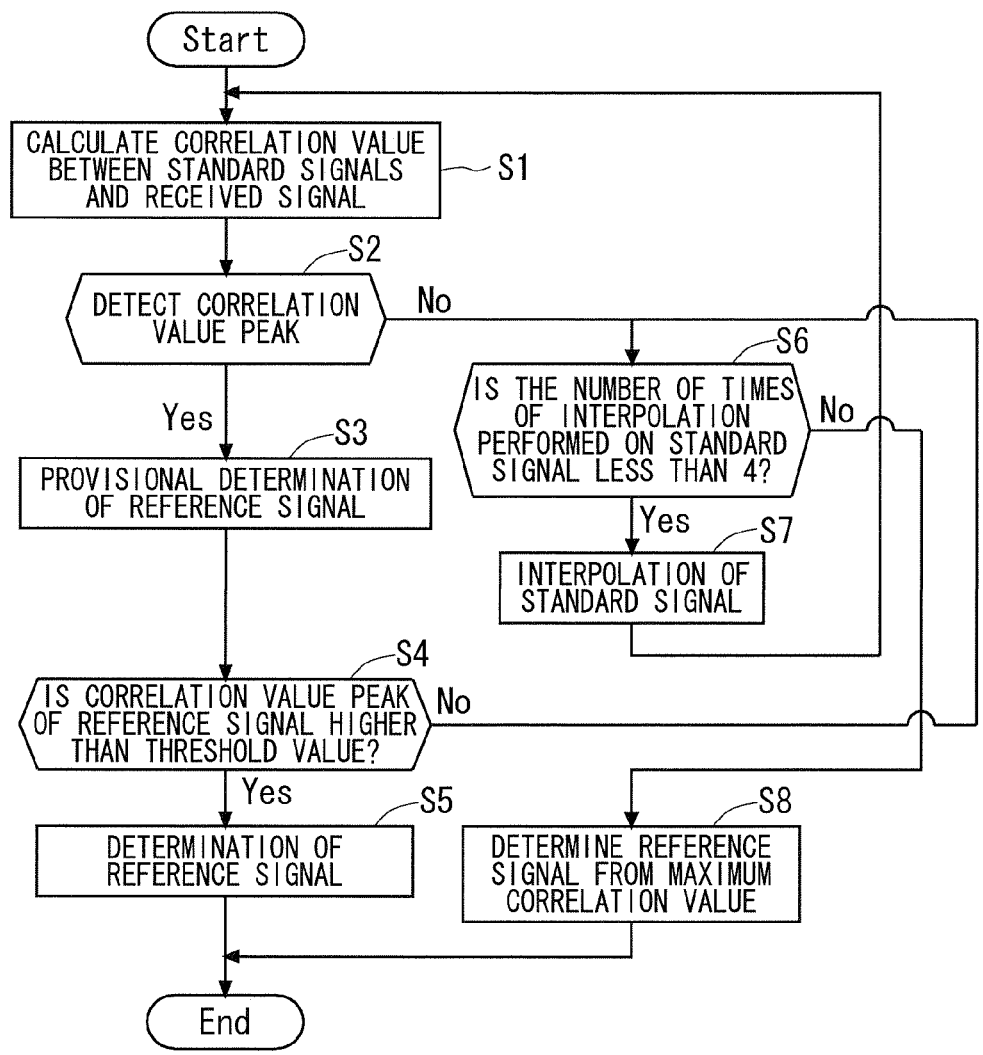
FIG. 3 is a flowchart showing a method of determining a reference signal performed in the wireless communication device according to the preferred embodiment of the present invention.

FIG. 3 is a flowchart illustrating the method of determining a reference signal performed in the wireless communication device 1 in accordance with the preferred embodiment of the present invention.

As shown in FIG. 3, the correlation value calculation unit 32 (FIG. 2) performs a correlation operation between the received signal after being subjected to the FFT processing by the FFT processing unit 31 (FIG. 2) and the standard signals held by the standard signal holding unit 34 (FIG. 2) (Step S1), to thereby calculate correlation values. Herein, the correlation operation is performed between the GI of the received signal and a complex conjugate of data of 64 symbols at the tail of the data part of the received signal. The correlation operation may be performed by a well-known method.

At this time, eight standard signals that are set at intervals of eight symbols as described previously are held in the standard signal holding unit 34, and the correlation operation is performed between the received signal and each of the standard signals. As a result, eight correlation values corresponding to the eight cut portions are acquired. The reference signal selection unit 33 detects a peak value (correlation value peak) from among the eight correlation values (Step S2).

Figure 4:
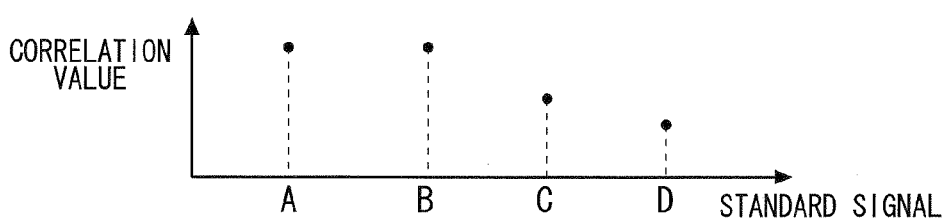
FIG. 4 is a view showing correlation values with respect to standard signals.

FIG. 4 shows respective correlation values with respect to standard signals, and specifically, shows respective correlation values with respect to standard signals A, B, C, and D.

In FIG. 4, the correlation value for the standard signal A and the correlation value for the standard signal B are substantially the same, and the respective correlation values for the standard signals C and D are smaller than the correlation values for the standard signals A and B. When a plurality of correlation values having substantially the same value are thus acquired, it cannot be determined which one of the correlation values is a maximum value (peak) and accordingly the correlation value peak cannot be detected. In such a case, it is determined that the peak may exist between the standard signals, and the process goes to Step S6.

In Step S2, a difference in the correlation value between adjacent standard signals is detected, and when the adjacent standard signals have substantially the same correlation values or when the difference in the correlation value therebetween is very small, it is determined that the correlation value peak cannot be detected. In this case, assuming that the comparison of the correlation values is performed in order from either the cut position 0/8 or the cut position 8/8, when the difference in the correlation value between the adjacent standard signals is larger than or equal to a predetermined value, comparison between the higher correlation value and the correlation value at the next cut position is performed. By repeating this process to rank the correlation values, the reference signal selection unit 33 prepares for interpolation of the standard signal, which will be described later in Step S7.

For example, in the exemplary case shown in FIG. 4, since the correlation value for the standard signal A and the correlation value for the standard signal B are substantially the same and higher than the other correlation values, preparation is first made for interpolation between the respective cut positions corresponding to the standard signals A and B. This increases the possibility of detecting the correlation value peak.

The procedure for interpolation is, of course, not limited to this procedure, and interpolation may be first performed, for example, between the cut position corresponding to either the standard signal A or B and a cut position adjacent thereto. In this case, it is possible to handle a case in which the correlation value peak appears at an irregular position.

On the other hand, when the correlation value obtained for any of the standard signals is far higher than the other correlation values, the standard signal corresponding to that correlation value is provisionally determined as the reference signal (Step S3).

In Step S6, the number of times of interpolation performed on the standard signal is checked. When the number of times of interpolation performed on the standard signal is less than four, the process goes to Step S7, and interpolation of the standard signal is performed.

Herein, interpolation of the standard signal refers to generation of a new standard signal in addition to the already used standard signals. This process is referred to as "interpolation" because a new standard signal is generated so that the head position of the data part of the new standard signal is located between the already used standard signals.

In Step S7, for example, the correlation values for the standard signals A and B are substantially the same in the exemplary case of FIG. 4, a new standard signal is generated so that the head position of the data part of the new standard signal is located between the cut positions corresponding to the standard signals A and B, and the processes from Step S1 are repeated.

The result is shown in FIG. 5. FIG. 5 shows the correlation value for a standard signal α, which is the new standard signal generated by the interpolation, in addition to the correlation values for the standard signals A, B, C, and D.

Figure 6:
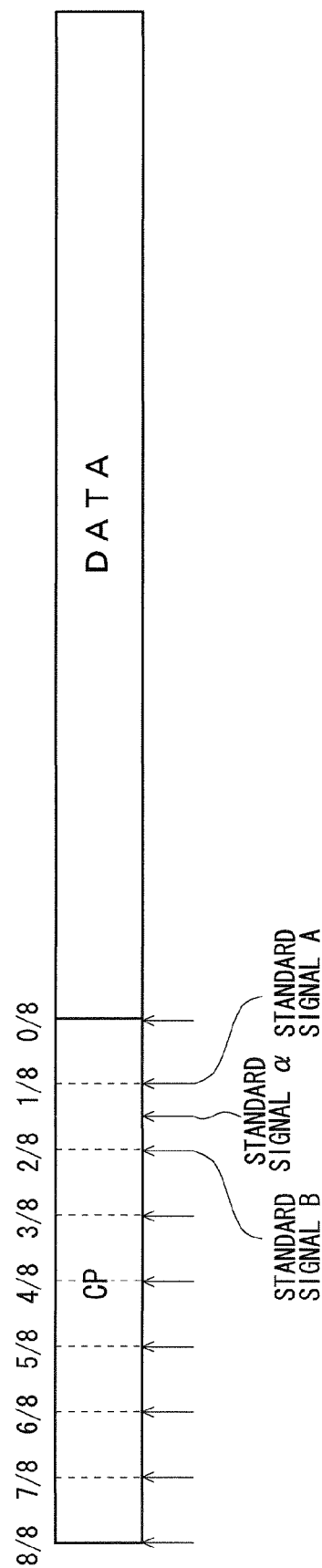
FIG. 6 is a view showing respective cut positions corresponding to the standard signals.

FIG. 6 shows a frame of the received signal indicating a cut position corresponding to the standard signal α. In the case where the standard signal A corresponds to the cut position 1/8 and the standard signal B corresponds to the cut position 2/8, the standard signal α is set so that a cut position thereof is located between the cut positions corresponding to the standard signals A and B.

Herein, a standard signal to be generated by interpolation can be generated by shifting any of the already generated standard signals by a predetermined number of symbols. In the exemplary case of FIG. 11, the standard signal a can be generated by shifting the 1/8 standard signal by four symbols.

Since the correlation value for the standard signal α is far higher than the other correlation values in FIG. 5, it is determined in Step S2 that the correlation value peak has been detected, and the standard signal which provides the correlation value peak is provisionally determined as the reference signal (Step S3).

Next, the reference signal selection unit 33 determines whether or not the correlation value at the position of the provisional reference signal is higher than a preset threshold value (Step S4). When it is determined that the correlation value is higher than the threshold value, the provisional reference signal is determined as the reference signal (Step S5). Since FIG. 5 shows a case where the correlation value for the standard signal α is higher than the threshold value, the standard signal α is determined as the reference signal. After the reference signal is determined, the process of selecting the reference signal is finished.

Though the above threshold value is set to a value around a correlation value obtained by a shift from the correlation value peak by e.g., four symbols in this case, this is only one exemplary case.

On the other hand, when it is determined in Step S4 that the correlation value for the provisional reference signal is less than the preset threshold value, the process of Step S6 is performed again to check the number of times of interpolation performed on the standard signal. When the number of times of interpolation performed on the standard signal is less than four, the process goes to Step S7 and interpolation of the standard signal is performed again.

Figure 7:
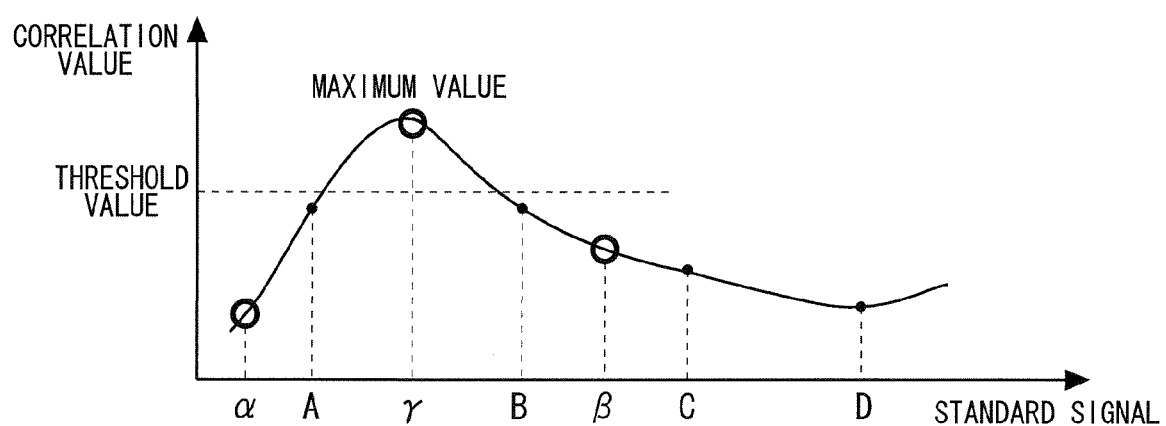
FIG. 7 is a view showing correlation values with respect to the standard signals in a case where the second and third interpolations are performed.

In this case, a standard signal corresponding to a cut position different from that of the standard signal α is generated. FIG. 7 shows respective correlation values with respect to the standard signals in a case where the second and third interpolations are performed. In this case, assuming that the correlation value peak is obtained by the third interpolation and the standard signals generated by the first and second interpolations are referred to as standard signals α and β respectively, shown are correlation values with respect thereto. As shown in FIG. 7, the correlation values with respect to the standard signals α and β are both smaller than the preset threshold value, and the correlation value peak is obtained from the standard signal γ generated by the third interpolation.

Figure 8:
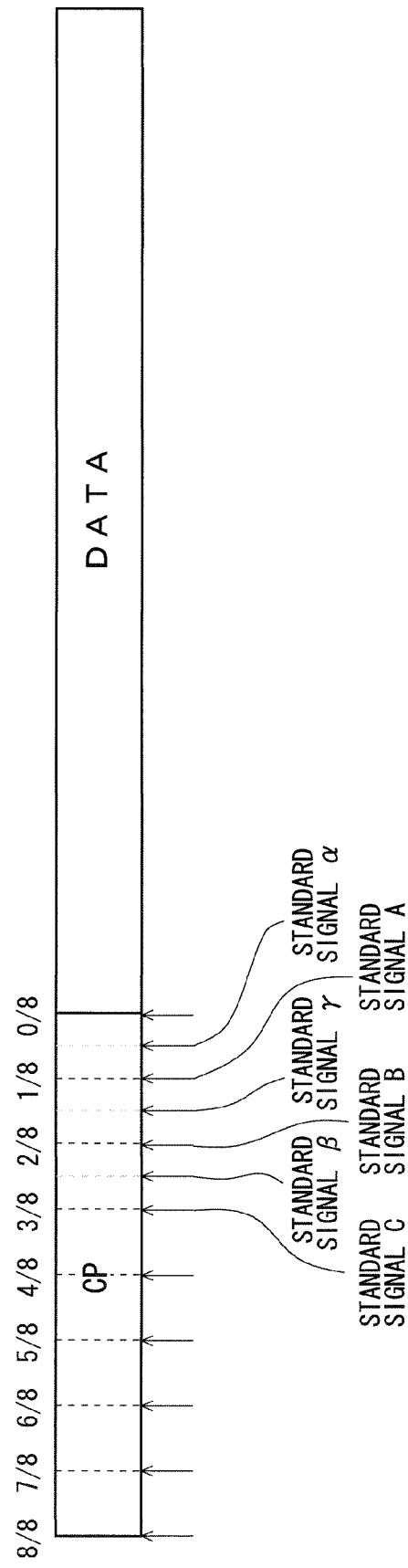
FIG. 8 is a view showing respective cut positions corresponding to the standard signals.

FIG. 8 shows a frame of the received signal indicating cut positions corresponding to the standard signals α, β, and γ. The standard signal α is set so that a cut position thereof is located between the cut position 1/8 and the cut position 0/8, the standard signal β is set so that a cut position thereof is located between the cut position 2/8 and the cut position 3/8, and the standard signal γ is set so that a cut position thereof is located between the cut positions corresponding to the standard signals A and B.

Thus, in the first and second interpolations, it is determined in Step S2 that the correlation value peak is not detected, and it is determined in Step S4 that there is no correlation value peak higher than the preset threshold value. Interpolation is, however, not performed anymore since the interpolation of the standard signal is performed up to three times (Step S6). The reference signal selection unit 33 selects a maximum value from among the acquired correlation values and determines the standard signal (including the standard signal generated by interpolation) corresponding to the selected correlation value as the reference signal (Step S8). Specifically, in the exemplary case of FIG. 8, the standard signal γ is determined as the reference signal.

As discussed above, when the correlation value peak cannot be detected from among the standard signals prepared in advance, a new standard signal is generated such that the head position of the data part is located between the cut positions corresponding to the standard signals prepared in advance. This increases the accuracy of selection of the reference signal.

Though the number of times of interpolation to be performed is less than four in the above discussion, this is only one exemplary case. The number of times of interpolation to be performed may be increased as long as the time required for interpolation and correlation operations is within permissible limits, and ultimately, interpolation may be performed so that correlation operations are performed at intervals of one symbol.

Though the GI consists of 64 symbols in the above discussion, the present invention is not limited to this case but may be applied to cases where the GI consists of a larger number of symbols.

<Variation>

While the method of determining a reference signal discussed above is a method for improving the accuracy of selection of the reference signal by repeating the interpolation of a standard signal, a method for correcting the reference signal may be adopted when the correlation value peak higher than the preset threshold value cannot be obtained after execution of a predetermined number of interpolations. Hereinafter, with reference to the flowchart of FIG. 9, discussion will be made on the method for correcting the reference signal.

Figure 9:
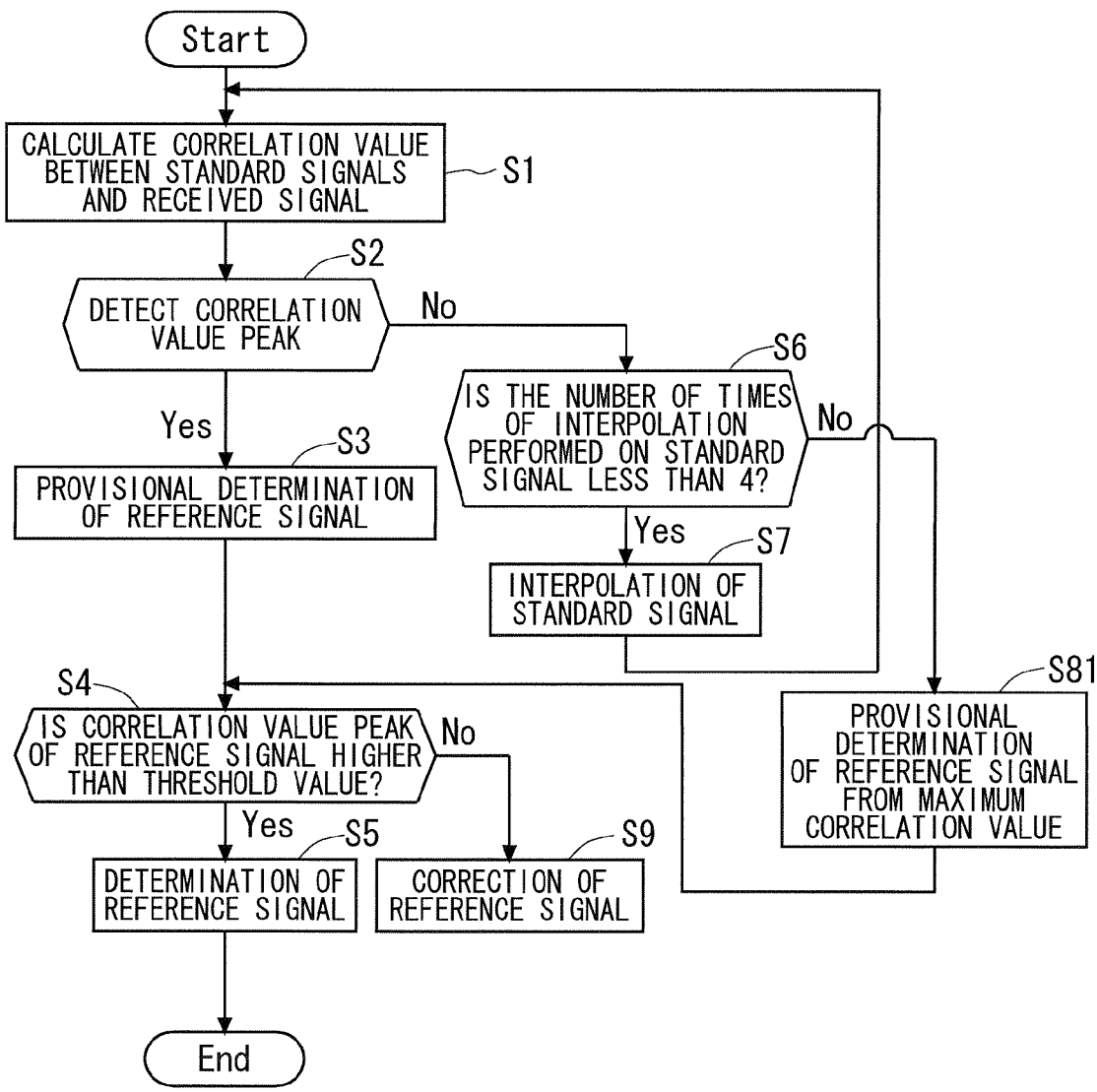
FIG. 9 is a flowchart showing a variation of the method of determining a reference signal performed in the wireless communication device according to the preferred embodiment of the present invention.

Steps S1 to S7 in the flowchart of FIG. 9 are the same as those in the flowchart of FIG. 3, and therefore discussion thereof will be omitted.

In Step S2 in FIG. 9, when a correlation value obtained for any of the standard signals is far higher than the other correlation values and is detected as the correlation value peak, the standard signal corresponding to that correlation value is provisionally determined as the reference signal (Step S3). Further, when the interpolation of a standard signal is repeated and the number of times of performed interpolation exceeds four, a maximum value is selected from among the acquired correlation values, and the standard signal (including the standard signal generated by interpolation) corresponding to that correlation value is provisionally determined as the reference signal in Step S81.

Then, the reference signal selection unit 33 determines whether or not the correlation value at the position of the provisional reference signal is higher than the preset threshold value (Step S4), and when it is determined that the correlation value is higher than the threshold value, the provisional reference signal is determined as the reference signal (Step S5). When it is determined in Step S4 that the correlation value for the provisional reference signal is less than the preset threshold value, the reference signal is corrected (Step S9).

Herein, the correction of the reference signal in Step S9 will be discussed with reference to FIG. 10. Part (a) of FIG. 10 represents a phase of an exemplary received signal in an I/Q plane, and part (b) of FIG. 10 represents a phase of the provisional reference signal in the I/Q plane.

As shown in part (a) of FIG. 10, the phase of the received signal is −0.98079+0.19509i, and the phase of the reference signal is −1.

A difference in the phase (the amount of phase rotation) between the reference signal and the received signal is calculated by the equation "(phase of received signal)−(phase of reference signal)". Substituting the above values into the equation yields:

$$\text{Phase Difference} = \tan^{-1}(0.19509/(-0.98079)) - \tan^{-1}(0/(-1)) = 0.19635$$

Then, the amount of symbol shift can be acquired by multiplying the amount of phase rotation by the FFT size. Specifically, the amount of shift is: $0.19635/2\pi \cdot 64 = 2.00$. In this case, there is a delay of two symbols since the sign is positive.

Thus, since it is found that there is a shift of two symbols from the provisional reference signal, a reference signal is generated by shifting the provisional reference signal by two symbols, and this reference signal is determined as the final reference signal.

By correcting the reference signal thus, it is possible to further improve the accuracy of selection of the reference signal.

Since the process of correcting the reference signal takes more time than the process of interpolating a standard signal and detecting the correlation value peak, by adopting the method of provisionally determining a reference signal by the interpolation of a standard signal and correcting the provisional reference signal, it is possible to reduce the time required for the selection of the reference signal and to further improve the accuracy of selection of the reference signal.

While the invention has been shown and described in detail, the foregoing description is in all aspects illustrative and not restrictive. It is therefore understood that numerous modifications and variations can be devised without departing from the scope of the invention.

The invention claimed is:

1. A wireless communication device for determining a reference signal on the basis of correlation values between a received signal and a plurality of standard signals and calculating an antenna weight by using said reference signal, said device comprising:
   a standard signal holding unit for holding said plurality of standard signals;
   a correlation value calculation unit for performing a correlation operation between said received signal and said plurality of standard signals; and
   a reference signal selection unit for determining said reference signal from among said plurality of standard signals on the basis of a correlation operation result obtained by said correlation value calculation unit,
   wherein said plurality of standard signals are generated by shifting a head position of a data part of a known signal at a predetermined symbol interval, and said reference signal selection unit repeats a predetermined number of times, a process of performing a correlation operation between a new standard signal which is generated so that a head of said data part is located at some midpoint in said predetermined symbol interval and said received signal when a correlation value peak which provides a maximum value is not detected among a plurality of correlation values obtained by said correlation operation between said received signal and said plurality of standard signals, and
   wherein said reference signal selection unit determines a standard signal that provides said correlation value peak as a provisional reference signal and corrects said provisional reference signal by shifting said provisional reference signal by the amount of symbol shift calculated on the basis of the amount of phase rotation of said received signal, to thereby determine a reference signal obtained after correction as said reference signal when said correlation value peak is less than a preset threshold value.

2. The wireless communication device according to claim 1, wherein said reference signal selection unit determines a standard signal that provides said correlation value peak as said reference signal when said correlation value peak is higher than a preset threshold value.

3. The wireless communication device according to claim 1, wherein said plurality of standard signals each consists of a tail portion of said data part, which is an original of a guard interval of said received signal, and a copy of said data part.

4. A wireless communication device for determining a reference signal on the basis of correlation values between a received signal and a plurality of standard signals and calculating an antenna weight by using said reference signal, said device comprising:
   a standard signal holding unit for holding said plurality of standard signals;
   a correlation value calculation unit for performing a correlation operation between said received signal and said plurality of standard signals; and
   a reference signal selection unit for determining said reference signal from among said plurality of standard signals on the basis of a correlation operation result obtained by said correlation value calculation unit,
   wherein said plurality of standard signals are generated by shifting a head position of a data part of a known signal at a predetermined symbol interval, and said reference signal selection unit repeats a predetermined number of times, a process of performing a correlation operation between a new standard signal which is generated so that a head of said data part is located at some midpoint in said predetermined symbol interval and said received signal when a correlation value peak which provides a maximum value is not detected among a plurality of correlation values obtained by said correlation operation between said received signal and said plurality of standard signals, and wherein said reference signal selection unit generates said new standard signal so that said head of said data part is located at some midpoint in said predetermined symbol interval when standard signals which have correlation values indicating the highest value among said plurality of correlation values obtained by said correlation operation between said received signal and said plurality of standard signals are located adjacent to each other with said predetermined symbol interval.

5. A reference signal determination method of determining a reference signal to be used for calculation of an antenna weight, on the basis of correlation values between a received signal and a plurality of standard signals, said method comprising the steps of:
  (a) performing a correlation operation between said received signal and said plurality of standard signals; and
  (b) determining said reference signal from among said plurality of standard signals on the basis of a correlation operation result obtained in said step (a), wherein said plurality of standard signals are generated by shifting a head position of a data part of a known signal at a predetermined symbol interval, and in said step (b), a process of performing a correlation operation between a new standard signal which is generated so that a head of said data part is located at some midpoint in said predetermined symbol interval and said received signal is repeated a predetermined number of times when a correlation value peak which provides a maximum value is not detected among a plurality of correlation values obtained by said correlation operation between said received signal and said plurality of standard signals, and wherein in said step (b), when said correlation value peak is less than a preset threshold value, a standard signal that provides said correlation value peak is determined as a provisional reference signal, said provisional reference signal is corrected by shifting said provisional reference signal by the amount of symbol shift calculated on the basis of the amount of phase rotation of said received signal, and a reference signal obtained after correction is determined as said reference signal.

6. The reference signal determination method according to claim 5, wherein in said step (b), when said correlation value peak is higher than a preset threshold value, a standard signal that provides said correlation value peak is determined as said reference signal.

* * * * *